United States Patent [19]

Miller

[11] Patent Number: 5,296,785
[45] Date of Patent: Mar. 22, 1994

[54] FAIL-SAFE VEHICLE SUSPENSION SYSTEM INCLUDING SWITCHED RELUCTANCE MOTOR

[75] Inventor: John M. Miller, Saline, Mich.

[73] Assignee: Ford Motor Company, Dearborn, Mich.

[21] Appl. No.: 112,044

[22] Filed: Aug. 25, 1993

Related U.S. Application Data

[63] Continuation of Ser. No. 976,729, Nov. 16, 1992, which is a continuation of Ser. No. 812,644, Dec. 23, 1991, abandoned.

[51] Int. Cl.$^5$ ............................................. H02P 5/40
[52] U.S. Cl. .................................... 318/254; 318/687; 280/688
[58] Field of Search ............... 318/135, 138, 701, 254, 318/685, 687, 696, 717, 439; 280/688

[56] References Cited

U.S. PATENT DOCUMENTS

| | | | |
|---|---|---|---|
| 3,638,093 | 1/1972 | Ross ........................... | 318/687 |
| 3,861,487 | 1/1975 | Gill ............................ | 180/65 |
| 3,921,746 | 11/1975 | Lewus ......................... | 180/53 |
| 3,934,183 | 1/1976 | Säufferer .................... | 318/135 |
| 3,970,160 | 7/1976 | Nowick ....................... | 318/717 |
| 3,981,204 | 9/1976 | Starbard ..................... | 74/34 |
| 4,032,829 | 6/1977 | Schenauar ................... | 320/61 |
| 4,434,389 | 2/1984 | Langley et al. .............. | 318/254 |
| 4,526,401 | 7/1985 | Kakizaki et al. ............. | 280/707 |
| 4,620,619 | 11/1986 | Emura et al. ................ | 188/319 |
| 4,666,180 | 5/1987 | Shirakuma ................... | 280/707 |
| 4,684,867 | 8/1987 | Miller et al. ................ | 318/701 |
| 4,729,459 | 3/1988 | Inagaki et al. .............. | 188/299 |
| 4,740,738 | 4/1988 | El-Antably et al. .......... | 318/701 |
| 4,815,575 | 3/1989 | Murty .......................... | 188/299 |
| 4,846,317 | 7/1989 | Hudgens ...................... | 188/299 |
| 4,896,089 | 1/1990 | Kliman et al. ............... | 318/701 |
| 4,912,343 | 3/1990 | Stuart .......................... | 310/14 |
| 4,968,921 | 11/1990 | Giardini ....................... | 318/138 |
| 4,969,662 | 11/1990 | Stuart .......................... | 280/707 |
| 5,027,048 | 6/1991 | Masrur et al. ............... | 318/806 |
| 5,028,073 | 7/1991 | Harms et al. ................ | 280/840 |
| 5,070,284 | 12/1991 | Patil et al. ................... | 318/362 |

FOREIGN PATENT DOCUMENTS

| | | |
|---|---|---|
| 3522221 | 2/1986 | Fed. Rep. of Germany . |
| 2493059 | 4/1982 | France . |
| 1-164201 | 6/1989 | Japan . |
| 2-273051 | 11/1990 | Japan . |

OTHER PUBLICATIONS

*Torque-Summing Brushless Motor*, NASA Tech Brief, 2301 N.T.I.S. Tech Notes, Jan. 1987, Sprinfield, Va., USA.

Primary Examiner—William M. Shoop, Jr.
Assistant Examiner—John W. Cabeca
Attorney, Agent, or Firm—Roger May; Raymond Coppiellie

[57] ABSTRACT

The oscillatory spring movements of each wheel of a motor vehicle suspension system are damped by a switched reluctance machine which is actively controlled during standard suspension operation to define damping characteristics of the suspension or passively controlled to define a fail-safe damping rate in the event of failure within the system. The switched reluctance machines of a suspension system are selectively connected to standard control circuitry or fault control circuitry by relay contacts. Upon failure within the system, phases of the switched reluctance machines are charged via monopulsers which are controlled in response to rotational positions of the machines such that the machines operate as generators and withdraw energy from the suspension system and pass it to a parallel connected resistor and capacitor. Power for charging the phases of the switched reluctance machines is provided either from the capacitor or a power supply which is separately fused from the supply for the standard control circuitry. To ensure recognition of a failure and correction by an operator of a motor vehicle, preferably not all phases of a switched reluctance machine are operated in the fail-safe mode.

20 Claims, 3 Drawing Sheets

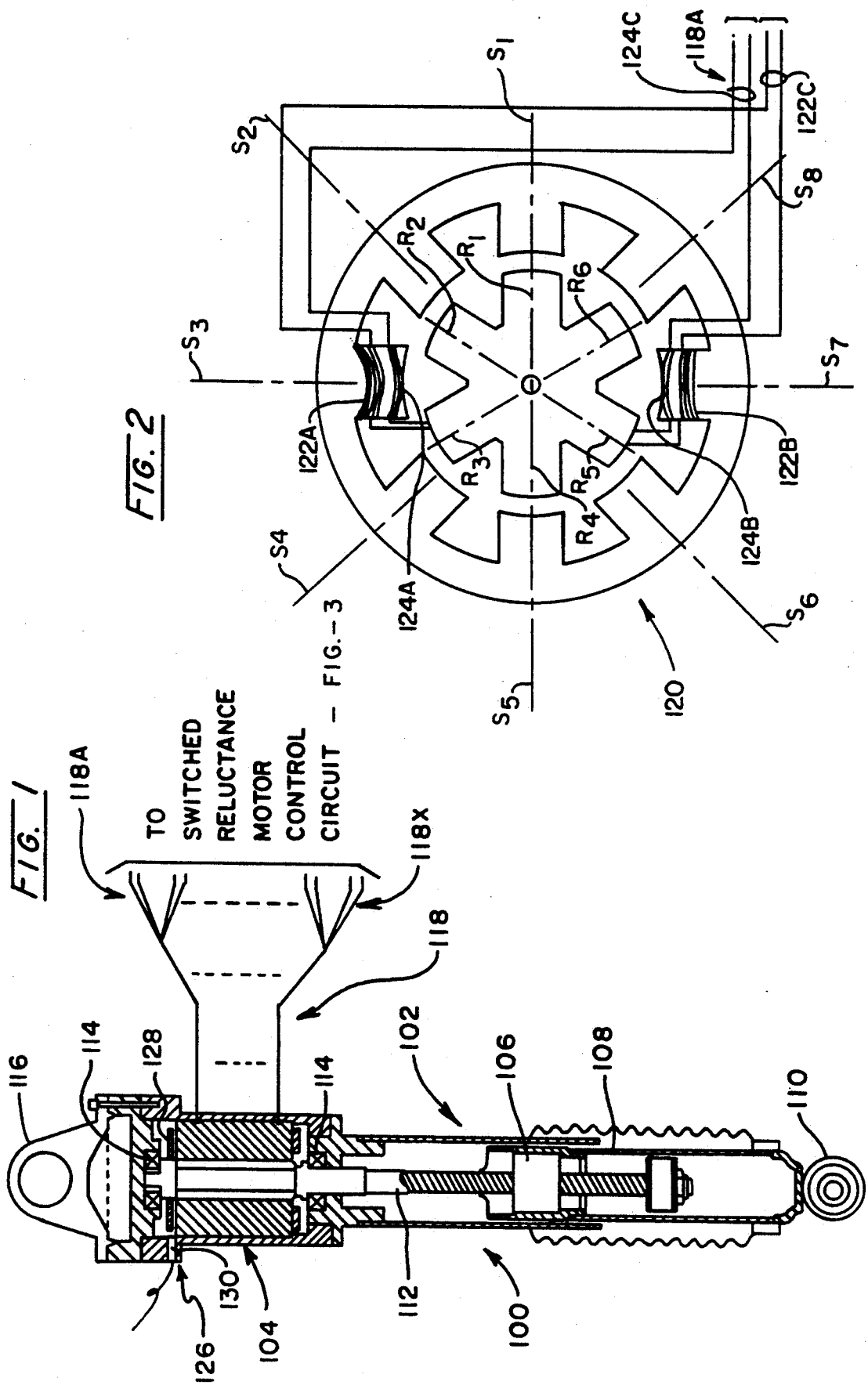

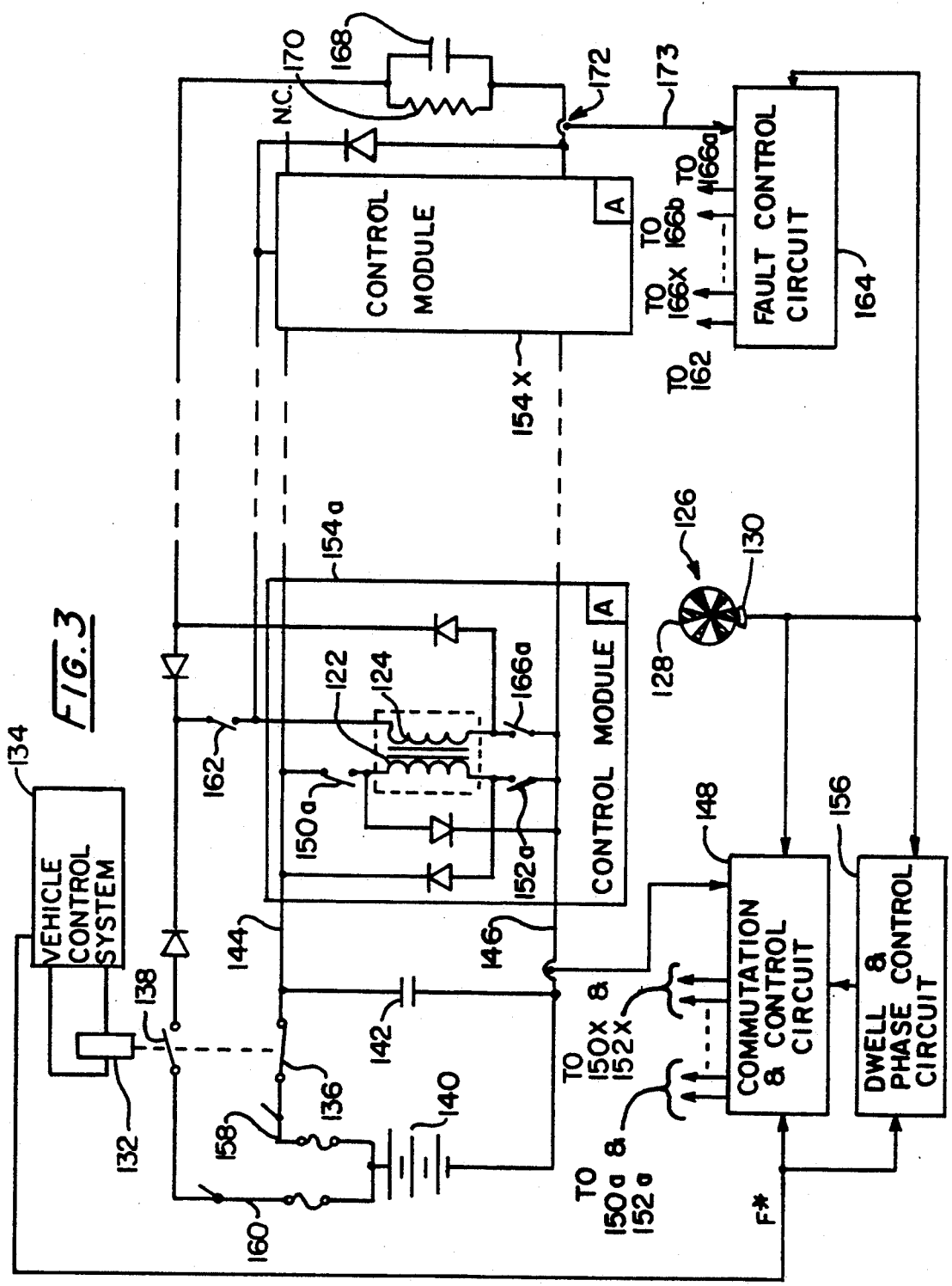

FAIL-SAFE VEHICLE SUSPENSION SYSTEM INCLUDING SWITCHED RELUCTANCE MOTOR

This is a continuation of application Ser. No. 07/976,729 filed Nov. 16, 1992 which is a continuation of application Ser. No. 07/812,644 filed Dec. 23, 1991, now abandoned.

BACKGROUND OF THE INVENTION

The present invention relates generally to suspension systems for motor vehicles and, more particularly, to a suspension system in which damping is actively controlled via switched reluctance motors and which defines a fail-safe damping for the suspension system in the event of failure within the system.

When a motor vehicle is driven, springs in its suspension system compress and expand to absorb shocks which would otherwise be transmitted to occupants of the vehicle. Once deflected, the springs continue to oscillate until they eventually return to their original state. Since spring oscillations create handling problems and reduce ride comfort of the vehicle, shock absorbers are used to dampen the oscillations of the springs and thereby stabilize the suspension system and return the springs to their original state substantially more quickly.

Traditionally, shock absorbers provide damping by means of hydraulic systems wherein hydraulic fluid, pistons, valves and the like define the damping provided by the shock absorber. More recently, shock absorbers have been constructed to incorporate electric motors to perform the damping operations. Both linear and rotary motors have been fashioned to operate suspension elements or shock absorbers within a motor vehicle suspension system. For rotary motors, the linear motion between sprung and unsprung masses of the chassis and wheels, respectively, of a motor vehicle are converted into rotational motion and controlled through the motor. A variety of motors including permanent magnet and switched reluctance have been incorporated in shock absorbing suspension designs.

In any damping suspension system, there is a concern for what damping rates will be applied in the event of failure within the suspension system. Fail-safe operation of a damping suspension system incorporating permanent magnet motors can be accomplished by connecting the motor windings across a load as disclosed in U.S. Pat. No. 5,070,284 which issued Dec. 3, 1991 and is assigned to the assignee of the present application. However, switched reluctance motors, as opposed to permanent magnet motors, have no inherent means of self-excitation and, as such, are incapable of developing torque in the absence of current flow in their windings.

U.S. Pat. No. 5,028,073 relates to a dynamic vehicle suspension system having shock absorbers incorporating rotary motors which are identified as permanent magnet and switched reluctance motors. Power is supplied to the motors from a power supply or a capacitor filter bank during normal operation of the suspension system. In the event of system failure, the windings of the machine are short-circuited. Unfortunately, as noted above, a switched reluctance motor requires an external source of excitation current such that short-circuiting the windings in a switched reluctance motor would result in loss of substantially all damping in the suspension system.

Thus, while switched reluctance motors can be used in suspension systems of motor vehicles and are desirable because of their simple construction and corresponding low costs, a problem can result in the event of failure within such a system. It is apparent that a need exists for an improved control system for operation of switched reluctance motors for use in motor vehicle suspension systems to provide a satisfactory fail-safe damping rate for the suspension system in the event of a failure within the system.

SUMMARY OF THE INVENTION

This need is met by the motor vehicle fail-safe suspension system of the present invention wherein the oscillatory spring movements of each wheel are damped by a switched reluctance machine which is standardly actively controlled to define the damping characteristics of the suspension system or passively controlled to define a fail-safe damping rate for the system.

The switched reluctance machines of a suspension system are connected to standard control circuitry or fail-safe or fault control circuitry by switch means comprising normally open and normally closed contacts, respectively, of a relay in the presently preferred embodiment. In the event of failure within the suspension system, phases of the switched reluctance machines are charged via monopulsers which are controlled in response to the rotational positions of the machines to operate as generators and withdraw energy from the suspension system and pass it to damping means taking the form of a parallel connected resistor and capacitor for each of the machines.

Power for charging the phases of the switched reluctance machines is provided either from the capacitors of the damping means or a preferred second power supply which is separately fused from the supply for the standard control circuitry. While the fail-safe mode of operation should be sufficiently reduced in effectiveness relative to the standard mode of operation to be noticeable, to ensure recognition of a failure by an operator of a motor vehicle and correction of the failure, preferably not all phases of a switched reluctance machine are operated in the fail-safe mode.

In accordance with one aspect of the present invention, a fail-safe suspension system for a motor vehicle having sprung and unsprung masses comprises a switched reluctance rotary machine including a rotor and a stator. A ball screw and nut apparatus are provided to connect the sprung and unsprung masses and rotate with the machine in alternate rotary directions as the sprung and unsprung masses move relative to one another. Sensor means connected to the machine sense the rotational positioning of the rotor of the machine. First controller means connected to the machine and the sensor means provide for standardly controlling the machine to thereby control the suspension system. In the event of failure within the standard control system, second controller means are connected to the machine and the sensor means for controlling the machine by defining a fail-safe damping rate for the suspension system.

Preferably for enhanced system reliability, the stator of the switched reluctance rotary machine includes at least one standard control winding connected to the first controller means and at least one fail-safe control winding connected to the second controller means. However, it is noted that switch arrangements can be provided to operate the standard control mode and the fail-safe control mode from a single set of windings. The second controller means may comprise damping means for defining the fail-safe damping rate for the suspension system, and the fail-safe suspension system further comprises switch means for selectively activating one of the first controller means and the second controller means. In the illustrated embodiment of the invention, the damping means comprises a capacitor and a resistor connected in parallel with one another.

In accordance with the present invention, a fail-safe excitation current is provided to the machine in the event of failure of the first controller means to operate the machine in the generating mode and thereby define a fail-safe damping rate for the suspension system. The system may further comprise current sensing means for sensing current flow through the damping means with the circuit means being connected to the current sensing means and further providing for limiting current flow through the damping means in response to current flow through the damping means. Preferably, the circuit means comprises pulse width modulation means for limiting current flow through the damping means and the switch means comprises field effect transistors.

It is thus a feature of the present invention to provide a suspension system for a motor vehicle wherein a fail-safe damping rate is provided for the suspension in the event of failure within the system; to provide a suspension system for a motor vehicle wherein sprung and unsprung masses are interconnected via a switched reluctance machine which rotates in alternate rotary directions as the masses move relative to one another with the machine being charged to operate in a generating mode in the event of failure within the system and thereby define a fail-safe damping rate for the suspension; and, to provide a suspension system for a motor vehicle wherein sprung and unsprung masses are interconnected via a switched reluctance machine which rotates in alternate rotary directions as the masses move relative to one another with the machine being connected via normally closed contacts of at least one relay to connect the machine to a fault control circuit in the event of failure within the system to precharge the machine for operation as a generator and thereby define a fail-safe damping rate for the suspension system.

Other features and advantages of the invention will be apparent from the following description, the accompanying drawings and the appended claims.

BRIEF DESCRIPTION OF THE DRAWINGS

FIG. 1 shows a single suspension damping unit or shock absorber including a switched reluctance machine operable in a fail-safe manner in accordance with the present invention;

FIG. 2 is schematic representation of a switched reluctance machine having an eight pole stator and a six pole rotor illustrating the preferred winding structure for the present invention;

FIG. 3 is a schematic diagram of circuitry for controlling a switched reluctance machine including standard machine control circuitry and fail-safe or fault control circuitry in accordance with the present invention.

DETAILED DESCRIPTION OF THE INVENTION

Figure 4:
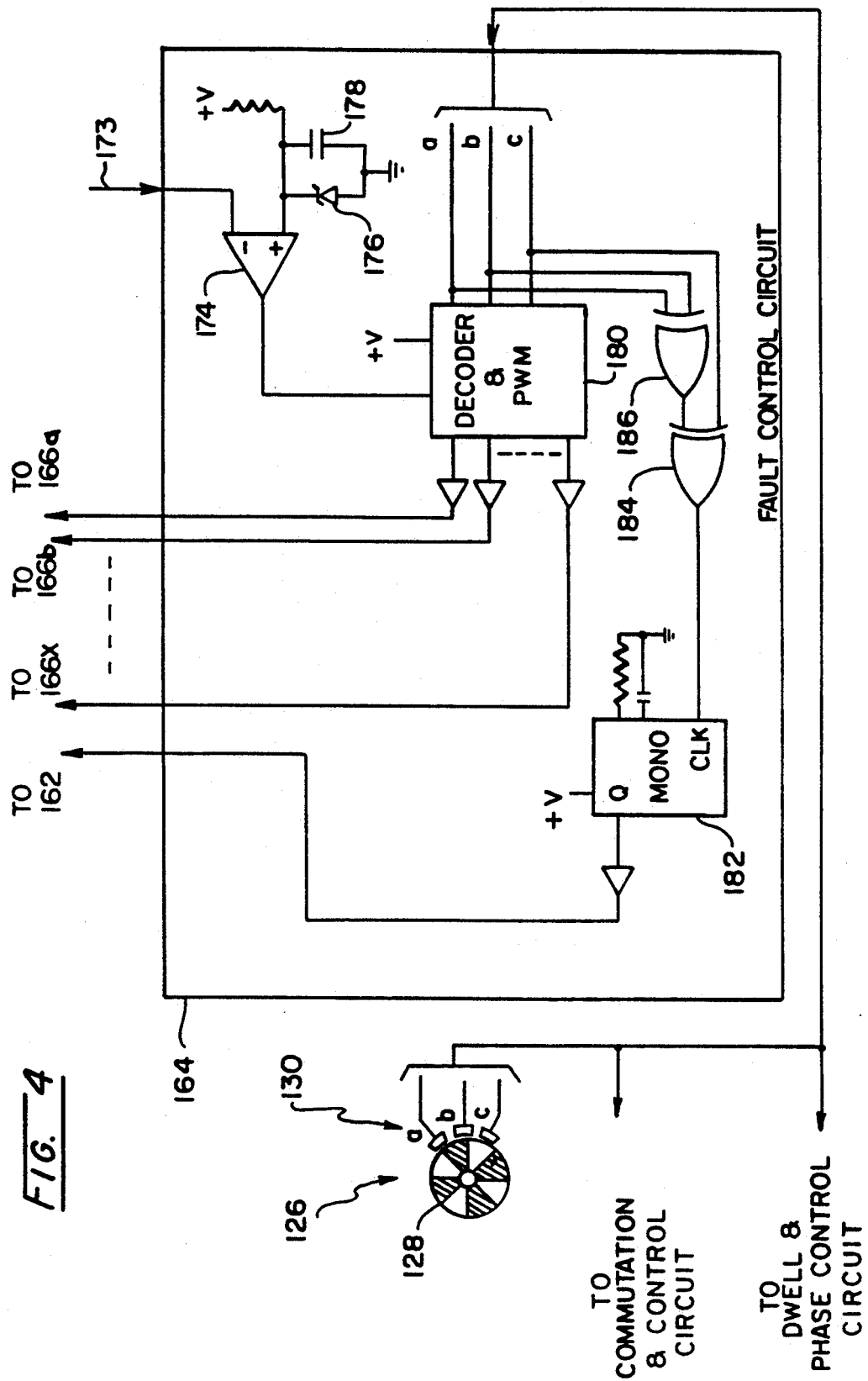
FIG. 4 is a schematic diagram of the fault control circuitry of FIG. 3.

With reference to FIG. 1, a single suspension damping unit or shock absorber 100 comprises a linear-to-rotary motion converter 102 and a rotary switched reluctance machine 104. The linear-to-rotary motion converter 102 comprises a ball screw and nut apparatus wherein a ball screw cage 106 is connected by a hollow, rigid connector tube 108 to a lower mounting eye 110 which may be connected to a lower control arm of a motor vehicle wheel support (not shown) in a well known manner.

A threaded shaft 112 is rotatably attached through bearing assemblies 114 to an upper mounting eye 116 which can be connected to a motor vehicle body (not shown) in a well known manner. The ball screw cage 106 is forced to move axially with the vehicle wheel support relative to the vehicle body and thus moves back and forth axially with suspension travel. As the threads on the shaft 112 move through the ball screw cage 106, the shaft 112 is forced to rotate in alternate rotary directions as the wheel support and motor vehicle body move relative to one another with the direction of rotation of the shaft 112 being determined by the direction of linear motion.

The upper end of the threaded shaft 112 carries the rotor of the switched reluctance machine 104. When the machine 104 is operated in a generator mode, such as in the fail-safe mode of the present invention, electric currents are generated by rotation of the rotor by the interaction of the thread of the shaft 112 with the ball screw cage 106. Electric currents are passed to or from the machine 104 via conductors 118 which connect stator phase windings of the machine 104 to first controller means for actively controlling the shock absorber 100 under normal operating conditions or for passively controlling the shock absorber 100 for fail-safe operation in accordance with the present invention.

Fail-safe operation of suspension damping units or shock absorbers including rotary multiphase permanent magnet electric machines has been addressed in the prior art. See U.S. Pat. No. 5,070,284 which is incorporated herein by reference and provides for operating a permanent magnet machine as an alternator into a load selected to define a fail-safe damping for the suspension system. The fail-safe load is connected upon the detection of a fault condition within the suspension system disclosed within this patent.

Because of their simple construction, corresponding low costs and robust nature, it is desirable to use switched reluctance machines in motor vehicle suspension systems. Unfortunately, if an associated suspension control system fails such that power is not provided to switched reluctance machines within a suspension system, the damping characteristics of the system are drastically reduced to the damping provided by the limited frictional and mechanical resistances to movement within the machines and connecting elements of the suspension system. These problems are overcome by the present invention which provides damping for a motor vehicle suspension system incorporating switched reluctance machines in the event of failure within the primary suspension control system.

In FIG. 2, a schematic representation of a switched reluctance machine 120 having an eight pole, $S_1$ through $S_8$, stator and a six pole, $R_1$ through $R_6$, rotor illustrates the preferred winding structure for one phase of a switched reluctance motor for use in the present invention. Each phase of a switched reluctance machine comprises windings on opposed stator poles of the stator of the machine. As shown in FIG. 2, a standard control winding 122 for one phase of the machine 120 comprises a first winding 122A wound onto stator pole $S_3$ and a second winding 122B wound onto stator pole $S_7$ which is opposed to stator pole $S_3$. The winding 122 is brought out of the machine 120 as a pair of conductors 122C which, for example, could be one of the two pairs of conductors 118A shown in FIG. 1. The winding 122 is connected to first controller means which forms a part of a motor control circuit illustrated in FIG. 3 and provides for standardly controlling the machine 120 in a manner well known in the art.

Since switched reluctance machines have no inherent means of self excitation as do permanent magnet machines, provision must be made for exciting the machine 120 in the event the first controller is unable to control the machine 120. In the preferred embodiment of the present invention, a separate fail-safe control winding 124 for one phase of the machine 120 comprises a first winding 124A wound onto stator pole $S_3$ and a second winding 124B wound onto stator pole $S_7$ which is opposed to stator pole $S_3$. The winding 124 is brought out of the machine 120 as a pair of conductors 124C which, for example, could be one of the two pairs of conductors 118A shown in FIG. 1.

Similar standard control winding pairs and fail-safe winding pairs (not shown for ease of illustration) are provided for each of the other pairs of stator poles: $S_1$, $S_5$; $S_2$, $S_6$; and $S_4$, $S_8$. While separate standard control windings and fail-safe control windings are preferred due to the resulting improved reliability, it is noted that switch arrangements can be provided such that the same windings can be used for both standard and fail-safe control of the machine 120 as will be apparent to those skilled in the art from the present disclosure.

Operation of a suspension system including the present invention will now be described with reference to FIG. 3 which is a schematic diagram of circuitry for controlling a switched reluctance machine including standard machine control circuitry and fail-safe or fault control circuitry in accordance with the present invention. For operation of a switched reluctance machine, a rotor shaft position sensor 126 is provided as shown in FIGS. 1, 3 and 4. While a variety of rotor shaft position sensors can be used, in the illustrated embodiment the rotor shaft position sensor comprises a magnet wheel 128 mounted to the rotor shaft and one or more sensors 130 mounted to sense the magnet wheel 128. Signals representative of the rotary position of the rotor shaft of the switched reluctance motor 104 are passed to circuitry for controlling the motor 104 for both standard operation and fail-safe operation.

For normal operation of the shock absorber 100, a relay 132 is operated via a suspension enable signal generated by a vehicle control system 134 which monitors the vehicle suspension system. A number of vehicle control systems are known in the art. Since the structure and philosophy of the vehicle control system 134 are not important to the present invention beyond the generation of a suspension enable signal, details of such systems will not be further disclosed herein. Those desiring additional information regarding vehicle control systems are referred to U.S. Pat. No. 5,027,048 which is incorporated herein by reference.

Operation of the relay 132 closes a normally open contact 136 and opens a normally closed contact 138 of the relay 132 as shown in FIG. 3. Thus, for normal operation, power from a vehicle battery 140 is connected to a capacitor 142 which is connected between a positive power bus 144 and a negative power bus 146. A commutation and control circuit 148 generates control signals for operating phase activation switches 150 and 152 for actively operating the switched reluctance motor 104 of each suspension damping unit or shock absorber 100 of a motor vehicle suspension system. A control circuit for controlling a multiple phase switched reluctance motor is shown in FIG. 3. Accordingly, control modules 154a through 154x are shown. Each of the control modules 154a through 154x are identical to one another such that only the control module 154a is illustrated and described in detail herein.

As shown in FIG. 3, the control module 154a is connected to a standard control winding and a fail-safe control winding. For illustration purposes, the standard control winding connected to control module 154a is shown as the standard control winding 122 of FIG. 2 and the fail-safe control winding connected to the control module 154a is shown as the fail-safe control winding 124 of FIG. 2. To correspond the control circuit of FIG. 3 fully to the switched reluctance motor of FIG. 2, the last control module to the right side of FIG. 3 would be 154d and would be connected to the windings associated with the stator poles $S_4$, $S_8$ as previously described.

In any event, the commutation and control circuit 148 controls the phase activation switches 150 and 152 in a known manner in response to signals representative of the rotary position of the rotor of a switched reluctance machine which are passed to the commutation and control circuit 148 and also to a dwell and phase control circuit 156 which provides dwell and phase control signals to the commutation and control circuit 148. The commutation and control circuit 148 also receives a force signal F* from the vehicle control system 134.

As described to this point, operation of a suspension system including the shock absorber 100 is in accordance with known motor vehicle suspension system technology. However, in the event of failure within this standard control arrangement, the switched reluctance machine 104 cannot be connected to one or more selected damping resistors as described in U.S. Pat. No. 5,070,284 since the switched reluctance machine is not self-exciting. Instead, operation of a suspension system is performed in accordance with the present invention to provide fail-safe operation upon such a system failure.

Upon detection of a suspension system failure or upon failure resulting in the release of the relay 132, the normally open contact 136 is opened and the normally closed contact 138 is closed to switch operation of the system from the standard suspension control mode to the fail-safe control mode. In addition to the provision of separate standard control windings and fail-safe control windings, preferably the standard control circuitry and the fail-safe control circuitry are powered from two separate circuits 158 and 160, respectively.

In the fail-safe mode, the switched reluctance machine 104 is operated in a generating mode with each phase initially being charged by connecting power to it for excitation purposes to achieve the function performed by the magnets in a permanent magnet machine. At the start of a phase conduction interval, a switch 162 is activated by a fault control circuit 164. A switch 166 of the corresponding phase is also activated to conduct power from the circuit 160 to the fail-safe winding 124 for that phase. Current through the switch 162 comes from the battery 140 and/or from a capacitor 168 which is connected in parallel with a resistor 170 to form damping means which define a fail-safe damping rate for a suspension system including the present invention. After the switch 162 is turned off after charging the currently selected phase, the corresponding one of the switches 166 is controlled to regulate the current flow through that phase, see the switch 166a in FIG. 3.

Fail-safe operation of the switched reluctance machine 104 will now be described in more detail with reference to FIG. 4. Current flowing through the damping means is monitored via a current sensor 172 which passes a current signal via a conductor 173 to the inverting or negative input of an operational amplifier 174. The sensed current is compared to a desired maximum current level which is defined by a zener diode 176 connected in parallel with a capacitor 178 and to a voltage source +V greater in value than the zener voltage. The operational amplifier performs as a comparator to generate an error signal which is passed to a control input of a pulse width modulation (PWM) circuit 180, for example an integrated circuit commercially available from the Motorola Corporation and identified as an MC33034 can be used.

The PWM circuit 180 also decodes input signals from the rotor shaft position sensor 126 so that the proper phase of the machine 104 can be activated via the corresponding switch 166. The resulting control signals to the currently activated phase control switch 166a–166x are pulse width modulated as required to limit the current to acceptable levels. The decoding performed within the PWM circuit 180 also interprets the rotor angle signals from the rotor shaft position sensor 126 to activate the switches 166 in the proper sequence for clockwise and counterclockwise rotation.

The switch 162 is activated by a monopulser circuit 182 which is activated by decoding input signals from the rotor shaft position sensor 126 via exclusive or (XOR) gates 184, 186. Pulse time provided by the monopulser circuit 182 is set to correspond to the highest anticipated frequency of operation of the switched reluctance machine 104. Alternately, a frequency to voltage F/V converter could be provided for the fault control circuit 164 to select the pulse times provided by the monopulser circuit 182.

The fail-safe mode of operation of the suspension system should be substantially different from the standard control of the suspension system such that an operator of a motor vehicle would detect a problem condition upon switch-over to the fail-safe mode of operation. However, to ensure that an operator indeed detects a fail-safe mode of suspension operation and seeks proper repair of the system, it may be preferred to operate less than all the phases of the switched reluctance motor 104 such that a clearly recognizable but safe mode of operation would be provided. To this end, one or more of the control leads for the switches 166a through 166x are not provided and/or are not connected to the corresponding switch or switches. To further facilitate detection of the fail-safe mode of suspension operation, it may be preferred to not provide the F/V converted suggested above as an improvement for operation of the fail-safe or fault control circuit 164.

Since failure of both the standard control and the fail-safe control requires a double fault, such as the loss of power to both of the two separate circuits 158 and 160, both systems should be monitored such that failure of either system can be signaled to an operator of a motor vehicle including a suspension system controlled in accordance with the invention. Thus, whether there was a fault in the standard control system or the fail-safe control system, it could be quickly corrected to ensure satisfactory operation of the motor vehicle.

Having thus described the present invention in detail and by reference to preferred embodiments thereof, it will be apparent that modifications and variations are possible without departing from the scope of the invention defined in the appended claims.

What is claimed is:

1. A fail-safe suspension system for a motor vehicle having sprung and unsprung masses comprising:
   a switched reluctance rotary machine including a rotor and a stator;
   a ball screw and nut apparatus connecting the sprung and unsprung masses and rotating with said machine in alternate rotary directions as the sprung and unsprung masses move relative to one another;
   sensor means connected to said machine for sensing rotational positioning of said rotor of said machine;
   first controller means connected to said machine and said sensor means for providing standard operating excitation current to actively control said machine and thereby said suspension system; and
   second controller means connected to said machine and said sensor means for providing fail-safe excitation current to passively control said machine in the event of failure of said suspension system and thereby define a fail-safe damping rate for said suspension system, said stator of said switched reluctance rotary machine including at least one standard control winding connected to said first controller means and at least one fail-safe control winding connected to said second controller means.

2. A fail-safe suspension system for a motor vehicle having sprung and unsprung masses as claimed in claim 1 wherein said second controller means comprises:
   damping means for defining the fail-safe damping rate for said suspension system; and
   said fail-safe suspension system further comprises switch means for selectively activating one of said first controller means and said second controller means.

3. A fail-safe suspension system for a motor vehicle having sprung and unsprung masses as claimed in claim 2 wherein said damping means comprises a capacitor and a resistor connected in parallel with one another.

4. A fail-safe damping suspension system for a motor vehicle having sprung and unsprung masses comprising:
   a switched reluctance rotary machine including a rotor and a stator, said machine being operable in a motoring mode and in a generating mode;
   a ball screw and nut apparatus connecting the sprung and unsprung masses and rotating with said machine in alternate rotary directions as the sprung and unsprung masses move relative to one another;
   rotational sensor means for generating a signal indicative of the rotational position of said rotor of said machine;
   first controller means connected to said machine and said rotational sensor means for providing standard operating excitation current to control said suspension system in said motoring and generating modes; and
   second controller means connected to said machine and said rotational sensor means for providing, in the event of failure of said first controller means, a fail-safe excitation current to said machine to operate said machine in said generating mode and thereby define a fail-safe damping rate for said suspension system, said stator of said machine including at least one first winding connected to said first controller means and at least one second winding connected to said second controller means.

5. A fail-safe damping suspension system for a motor vehicle having sprung and unsprung masses as claimed in claim 4 wherein said second controller means comprises:
   damping means for providing said fail-safe damping rate for said suspension system; and
   current control means for controlling current flow through said at least one second winding during fail-safe operation of said suspension system.

6. A fail-safe damping suspension system for a motor vehicle having sprung and unsprung masses as claimed in claim 5 wherein said damping means comprises a capacitor and a resistor.

7. A fail-safe damping suspension system for a motor vehicle having sprung and unsprung masses as claimed in claim 5 wherein said current control means comprises:
   switch means for connecting said damping means to said machine; and
   circuit means connected to said rotational sensor means for controlling said switch means based on said rotational position of said rotor of said machine to control said suspension system.

8. A fail-safe damping suspension system for a motor vehicle having sprung and unsprung masses as claimed in claim 7 further comprising current sensing means for sensing current flow through said damping means and wherein said circuit means is connected to said current sensing means and further provides for limiting current flow through said damping means in response to current flow through said damping means.

9. A fail-safe damping suspension system for a motor vehicle having sprung and unsprung masses as claimed in claim 8 wherein said circuit means comprises pulse width modulation means for limiting current flow through said damping means.

10. A fail-safe damping suspension system for a motor vehicle having sprung and unsprung masses as claimed in claim 7 wherein said switch means comprises field effect transistors.

11. A fail-safe damping suspension system for a motor vehicle having sprung and unsprung masses as claimed in claim 4 wherein said stator of said machine includes a plurality of first windings connected to said first controller means and a like plurality of second windings connected to said second controller means, said pluralities of first and second windings defining a plurality of phases of said machine.

12. A fail-safe damping suspension system for a motor vehicle having sprung and unsprung masses as claimed in claim 11 wherein said fail-safe excitation current provided by said second controller means is provided to less than all of said plurality of phases of said machine such that operation of said suspension is substantially different from the standard control provided by said first controller to thereby indicate to an operator of said motor vehicle failure of said first controller means.

13. A fail-safe damping suspension system for a motor vehicle having sprung and unsprung masses comprising:
   a multiple phase switched reluctance rotary machine including a rotor and a stator;
   a ball screw and nut apparatus connecting the sprung and unsprung masses and rotating with said machine in alternate rotary directions as the sprung and unsprung masses move relative to one another;
   sensor means for sensing angular position of said rotor of said machine;
   first controller means connected to said machine and said sensor means for providing standard operating excitation current to actively control said suspension system; and
   second controller means connected to said machine and said sensor means for providing fail-safe excitation current to passively control said suspension system in the event of failure of said first controller means, said second controller means providing fail-safe excitation current to less than all of said phases of said machine such that operation of said suspension is substantially different from the standard control provided by said first controller to thereby indicate to an operator of said motor vehicle the failure of said first controller means.

14. A fail-safe damping suspension system for a motor vehicle having sprung and unsprung masses comprising:
   a multiple phase switched reluctance rotary machine including a rotor and a stator;
   a ball screw and nut apparatus connecting the sprung and unsprung masses and rotating with said machine in alternate rotary directions as the sprung and unsprung masses move relative to one another;
   sensor means for sensing angular position of said rotor of said machine;
   first controller means connected to said machine and said sensor means for standardly controlling said suspension system; and
   second controller means connected to said machine and said sensor means for controlling said suspension system in the event of failure of said first controller means, said second controller means operating less than all of said phases of said machine to indicate to an operator of said motor vehicle the failure of said first controller means, said stator of said machine including a plurality of first windings defining said multiple phases and connected to said first controller means, and at least one second winding connected to said second controller means.

15. A fail-safe damping suspension system for a motor vehicle having sprung and unsprung masses as claimed in claim 13 wherein said second controller means comprises:
   damping means for controlling the damping rate of said machine, said damping means including power storage means for storing power generated by said machine such that stored power can be applied to said machine; and
   control means for connecting said damping means to said machine in the event of failure of said first controller means.

16. A fail-safe damping suspension system for a motor vehicle having sprung and unsprung masses as claimed in claim 15 wherein said control means comprises:
   switch means for connecting said damping means to said machine; and
   circuit means connected to said sensor means for controlling said switch means based on said rotational position of said rotor of said machine to control said suspension system.

17. A fail-safe damping suspension system for a motor vehicle having sprung and unsprung masses as claimed in claim 16 further comprising current sensing means for sensing current flow through said damping means and wherein said circuit means is connected to said current sensing means and further provides for limiting current flow through said damping means in response to current flow through said damping means.

18. A fail-safe damping suspension system for a motor vehicle having sprung and unsprung masses as claimed in claim 17 wherein said circuit means comprises pulse width modulation means for limiting current flow through said damping means.

19. A fail-safe damping suspension system for a motor vehicle having sprung and unsprung masses as claimed in claim 16 wherein said switch means comprises field effect transistors.

20. A fail-safe damping suspension system for a motor vehicle having sprung and unsprung masses as claimed in claim 15 wherein said damping means comprises a resistor and a capacitor.

* * * * *